April 5, 1932.   J. V. CARDEN   1,852,768
ENDLESS TRACK VEHICLE
Filed July 20, 1929
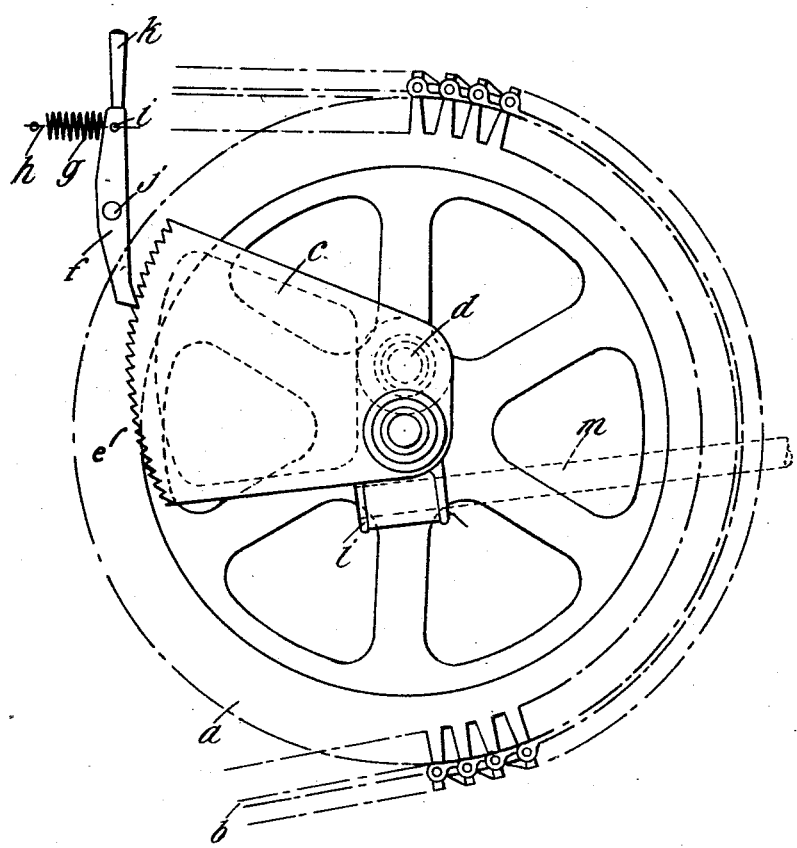
Inventor:
John Valentine Carden
By
Pennie Davis Marvin + Edmonds
attorneys

UNITED STATES PATENT OFFICE JOHN VALENTINE CARDEN, OF PICCADILLY, WESTMINSTER, ENGLAND, ASSIGNOR TO VICKERS-ARMSTRONGS LIMITED, OF WESTMINSTER, ENGLAND, A BRITISH COMPANY

ENDLESS TRACK VEHICLE

Application filed July 20, 1929, Serial No. 379,856, and in Great Britain August 24, 1928.

This invention relates to endless track vehicles and has particular though not exclusive reference to the type of vehicle in which each endless track passes around a driving sprocket wheel and an idler sprocket wheel, rollers or wheels being provided within the tracks at the lower part of the latter for supporting the vehicle. The chief object of the present invention is to provide improved adjusting mechanism that can be readily manipulated for taking up any slack in the endless track.

According to this invention, a wheel, roller or the like (which may be the aforesaid idler sprocket wheel) around which the endless track passes, is carried by a support that is adapted to be angularly moved to adjust the track as required and to be secured by locking means in any position to which it is set. The said locking means may comprise a ratchet and pawl mechanism and the ratchet teeth may be formed on the aforesaid support whilst the pawl may be suitably mounted to be maintained in engagement with the said ratchet teeth under the influence of a spring. The aforesaid support carrying the said wheel may be such that it is capable of rocking or angular movement on a pivot on a relatively fixed part disposed above the centre of the said wheel and it may be formed with an extension somewhat in the form of a segment and the outer surface of which is of arcuate formation and is provided with the ratchet teeth. The pawl for engaging the ratchet teeth may be pivoted at a point between its ends and so disposed that its lower end engages with the said ratchet teeth while its upper end is connected by means of a tension spring to a suitable fixed part of the vehicle, the said spring normally maintaining the pawl in engagement with the ratchet teeth. In order to adjust the said wheel for the purpose of taking up any slack in the endless track, the support carrying the wheel is angularly moved on its pivot in the direction in which the ratchet teeth slip past the spring controlled pawl whilst the latter holds the support against movement in the opposite direction so as to maintain it in the desired position. For the purpose of angularly moving the said support it may be provided with a hole or opening which may be formed in a boss or extension and which is adapted to receive a lever, tommy bar or the like so that when the outer end of the lever is lifted or raised the support will be moved on its pivot.

In order that the said invention may be clearly understood and readily carried into effect the same will now be described more fully with reference to the accompanying drawing which illustrates, by way of example, one convenient mode of carrying the invention into effect:—

$a$ is one of the wheels, rollers or the like around which the endless track $b$ passes and $c$ is the support by which the wheel $a$ is carried. The support is of segmental formation and is pivoted at $d$ on a suitable part of the vehicle, the pivot being disposed above the centre of the wheel $a$. $e, e$ are the ratchet teeth which are formed on the outer arcuate surface of the support and $f$ is the pivotally mounted pawl which is arranged so that its lower end engages with the ratchet teeth $e$. $g$ is the tension spring which has one of its ends $h$ connected to a suitable fixed part of the vehicle and its other end $i$ connected to the upper end of the pawl $f$. To enable the pawl to be rocked about its pivot $j$ it is formed with a handle $k$. $l$ is the boss or extension which is formed on the support $c$ and is provided with an opening for the reception of the end of a removable lever or tommy bar $m$ as indicated in dotted lines. When it is desired to take up slack in the endless track one end of the tommy bar $m$ is inserted in the opening in the boss $l$ and the other is raised so that the support $c$ is caused to turn on its pivot at $d$ in an anti-clockwise direction. During this movement of the support the ratchet teeth $e$ will slip past the spring controlled pawl $f$ but at the end of such movement the lower end of the pawl will be pressed by the spring $g$ into engagement with the ratchet teeth so that a retrograde movement of the support is prevented and the support and the wheel carried thereby will be held in the adjusted position.

In the following claims the term "wheel" is intended to include "roller".

What I claim and desire to secure by Letters Patent of the United States is:—

1. In an endless track vehicle, a wheel within said track, a substantially segmental shaped support for said wheel pivoted to the vehicle, means for the reception of a lever adapted angularly to move said support about its pivot to displace said wheel, and means co-operating with the arcuate edge of said support for maintaining the support in its adjusted position.

2. In an endless track vehicle, a wheel within said track, a substantially segmental shaped support for said wheel pivoted to the vehicle, means attached to said support for the reception of an element adapted angularly to move said support about its pivot to displace said wheel, said segmental shaped support being provided with ratchet teeth on its arcuate edge, and a pawl and spring co-operating with said teeth for maintaining the support in its adjusted position.

JOHN VALENTINE CARDEN.